Oct. 19, 1943.     D. McLACHLAN, JR     2,332,391
PROJECTOMETER
Filed Nov. 28, 1942     3 Sheets-Sheet 1
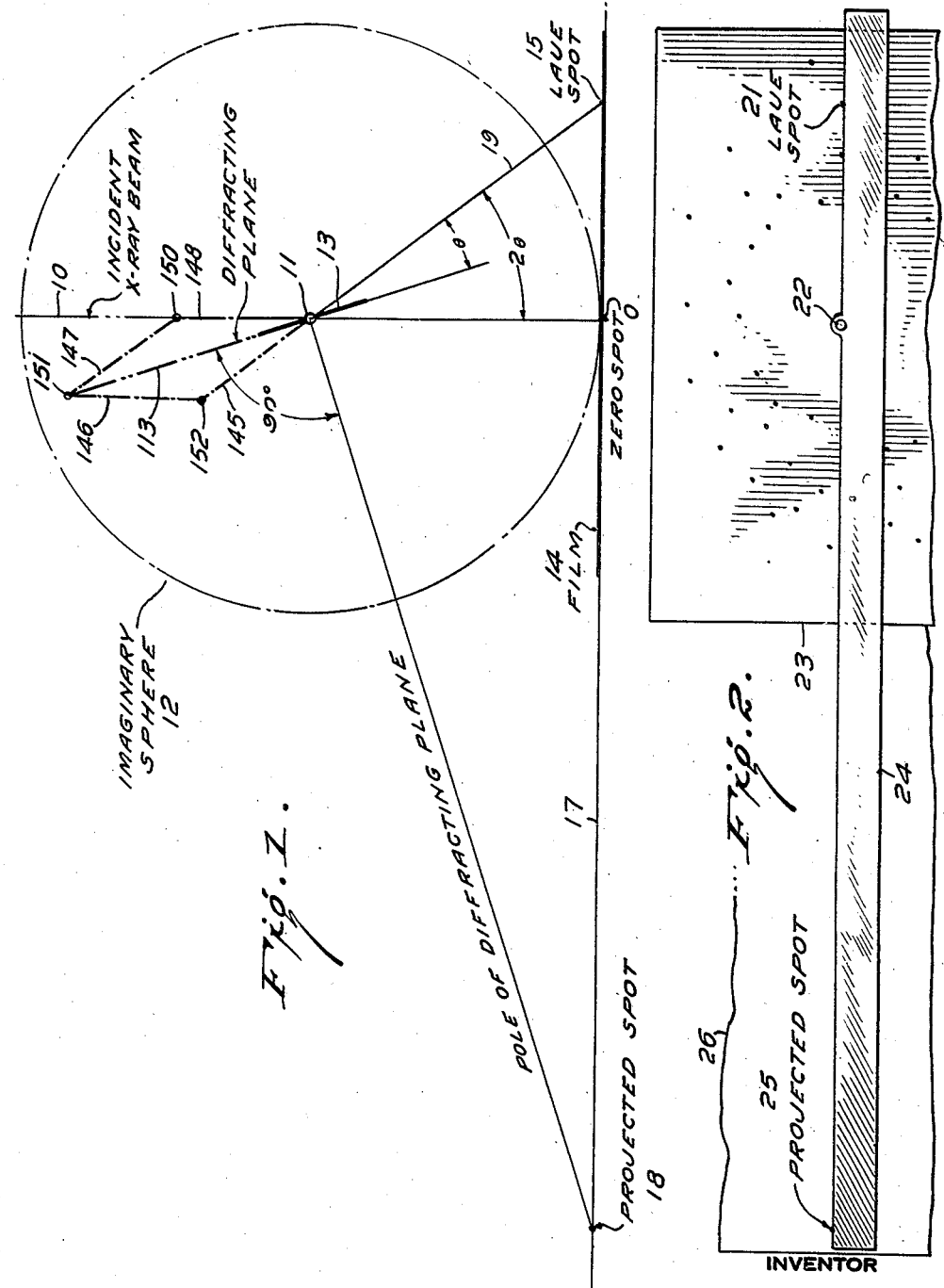
INVENTOR
DAN McLACHLAN, JR.,
BY
Frank J. Novotny
ATTORNEY

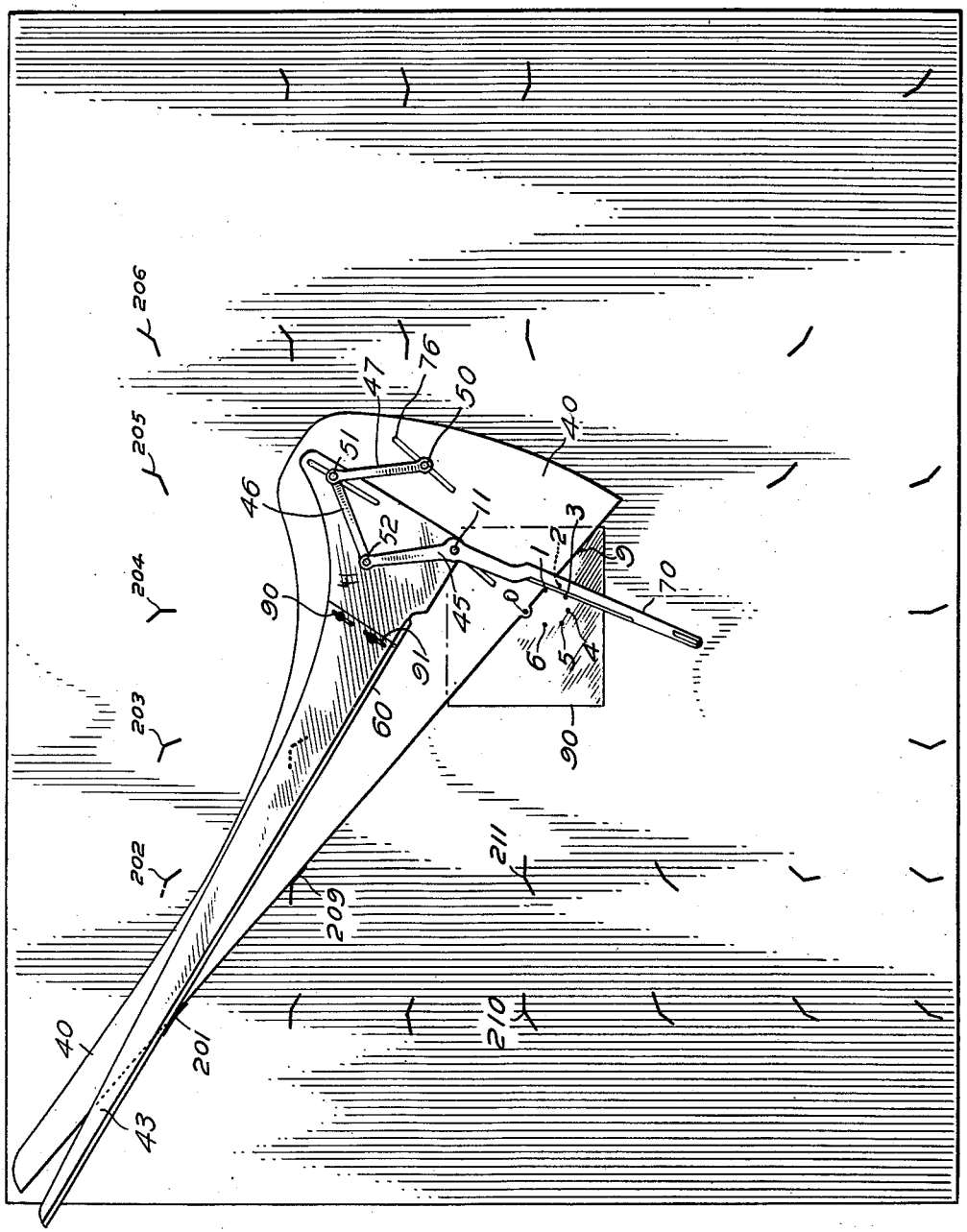

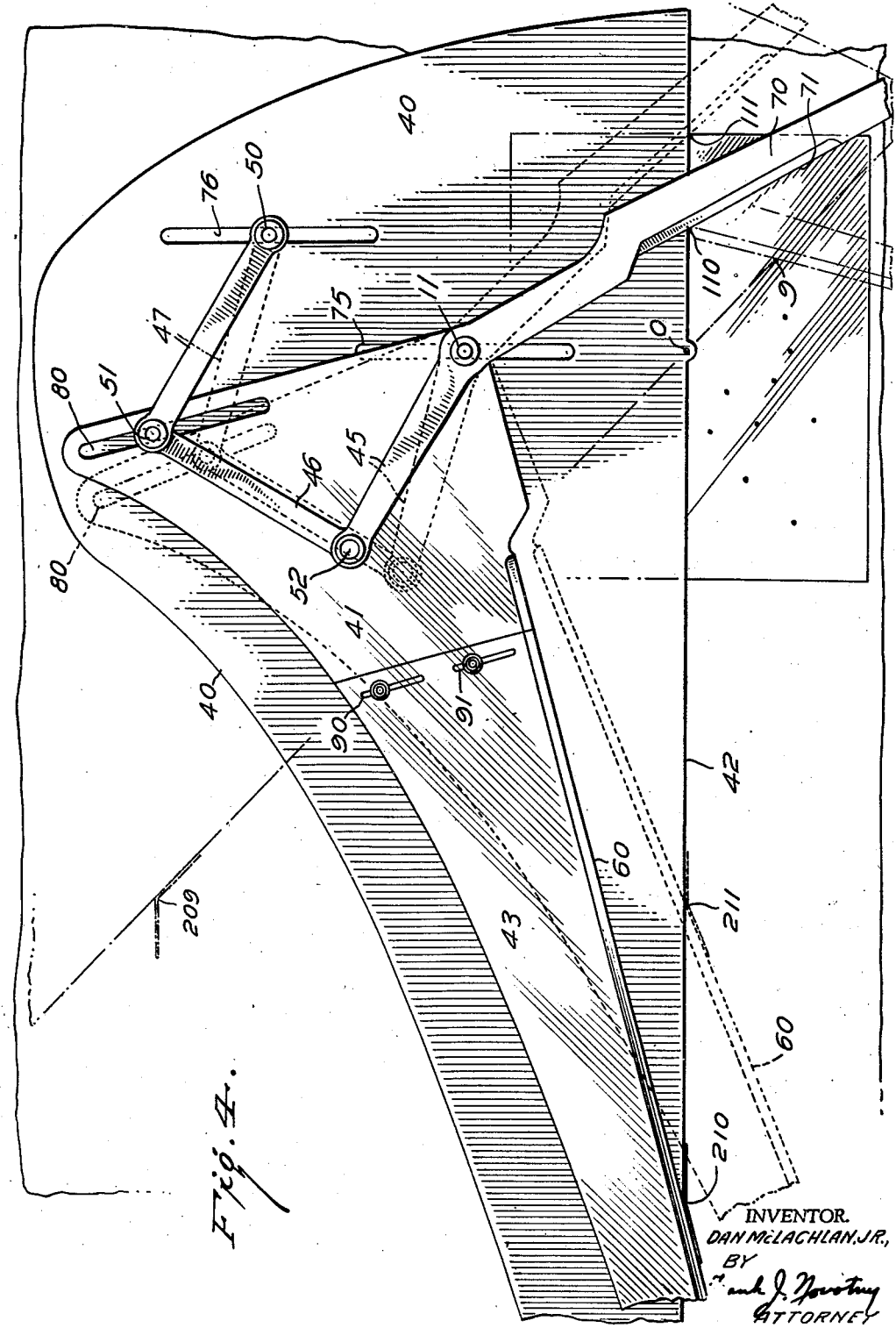

Patented Oct. 19, 1943

2,332,391

UNITED STATES PATENT OFFICE 2,332,391

PROJECTOMETER

Dan McLachlan, Jr., Old Greenwich, Conn., assignor to American Cyanamid Company, New York, N. Y., a corporation of Maine Application November 28, 1942, Serial No. 467,174

6 Claims. (Cl. 33—98)

This invention relates to a calculating device for use in solving problems encountered in X-ray technique. More particularly, it embraces an improved gnomonic projector for the graphic solution of problems incident upon the further clarification and interpretation of Laue X-ray diffraction patterns.

A number of photographic methods are now used for attacking a problem in crystal analysis. Thus, for example, the analyst may resort to the following methods among others: (1) the Laue method wherein a sample of material about $\frac{1}{18}$ of an inch thick is placed in the path of a beam of white or unfiltered X-rays; (2) the Bragg method wherein the interplanar spacings together with the selective intensities of different orders of the diffracted beams are used; (3) the powder or Hull-Debye-Scherrer method wherein a beam of monochromatic X-rays is passed through crystals which have been crushed to such a fine powder that the fragments have a random orientation; (4) the rotating crystal method wherein a single crystal is rotated or oscillated in a beam of monochromatic X-rays in order to obtain the photographic diffraction data necessary for a satisfactory crystal analysis; among others.

However, even after the diffraction data are obtained in accordance with the above methods a great amount of calculating is usually necessary in order to interpret the results and obtain a more or less complete analysis of the structure of a crystal. Thus, in the case of the Laue method the diffraction pattern which is obtained consists of a photographic negative wherein there are a number of spots, the loci of which are a series of ellipses all passing through the central image made by the primary or undeviated X-ray beam.

The interpretation of such a Laue diffraction pattern involves the identification of the plane-family associated with the spots on the X-ray photograph. This is an exceedingly laborious problem, particularly when resort is had to purely analytical methods. The labor, however, is lessened considerably by utilizing graphical methods of interpretation wherein each of the plane-families in the crystal is represented by a single point in a second plane called a plane of projection. This results in the reduction of the problem of orienting such plane-families from a problem embracing planes in a three-dimensional crystal to a graphical method of analysis of points on a two-dimensional or plane graph. The latter two-dimensional or plane graph is called the plane of projection.

In the past, the interpretation of, for example, Laue photographs has been usually effected graphically by means of gnomonic or stereographic projections of the photographic X-ray spots obtained in the usual manner well known to those versed in the art. In a gnomonic projection, the crystal is considered as being at the center of a sphere of projection as explained more fully below and in the accompanying drawings (see especially Fig. 1). The plane of projection is tangent to the sphere at the point of intersection of the zero beam spot with the sphere after the zero beam has passed through the crystal. Hence the undeviated X-rays strike the plane of projection perpendicularly. An X-ray beam or beams from a family of planes at the center of the sphere produces a Laue spot. It is well known in X-ray technology that if the angle between the zero or undeviated beam and the particular family of planes producing a Laue spot is $\theta$, then the angle between the deviated and undeviated beams is $2\theta$. Hence by bisecting the angle between the undeviated and diffracted beams, one obtains the angle $\theta$ which defines the position of the particular family of planes associated with a given Laue spot. If a line is drawn perpendicular to the diffracting plane at the point where it passes through the center of the sphere, one obtains a pole of this plane. By extending the pole until it intersects the imaginary plane of projection, one obtains a gnomonic projection of the pole. This process when applied to each of the Laue spots yields what is commonly known as a gnomonic projection of the Laue photograph.

In the past a number of labor-saving devices have been suggested in order to effect such a gnomonic projection with as little effort as possible. In particular, the Wycoff ruler was a device heretofore used to perform the mechanical operations necessary for such a projection. In use, the Wycoff ruler is laid with its zero indication on the zero beam spot of a Laue picture (see, for example, Fig. 2 below). The distance from the zero spot to a given Laue spot is then measured on one end of the ruler and the projection is made by selecting a corresponding numeral on the other or projecting end of the ruler. However, the Wycoff ruler is extremely difficult to read since the spacings of the units and decimals on its face are extremely irregular and skill in its use is dependent principally upon the ability of the operator to measure proportional parts or fractional parts of a unit with his eye. This latter operation introduces a considerable personal equation. As a consequence, it is difficult to obtain concordant results from one and the same Laue pattern when projected by different operators even though using the same Wycoff ruler. Such a procedure yields results which are obviously too unreliable and discrepancies are obtained which are too widespread for satisfactory use in connection with the present degree of accuracy necessitated in industry for the interpretation of X-ray diffraction data.

It is an object of this invention to provide a simple, compact mechanical device by means of which such gnomonic projections can be made more quickly and accurately than heretofore.

A further object of this invention is to provide a mechanical device on which all settings and readings are made directly, without necessitating the making of subsequent calculations such as additions, subtractions, interpolations, and the like. Another object is to provide a mechanical gnomonic projector in which it is unnecessary to read off figures, a procedure which is frequently accompanied by errors due to parallax, misjudgment of proportional or fractional parts, and the like.

It is a further object of this invention to provide means whereby calculations are reduced to mere mechanical steps so that anyone, whether familiar with mathematics or not, can prepare gnomonic projections of Laue diffraction patterns in order to determine: (1) the symmetry of an organic or inorganic crystal; (2) the relative directions in which the various planes of the atoms lie; (3) the distances between the planes themselves; among other details necessary for a complete crystal analysis.

Still other and further objects and advantages of the mechanical gnomonic projector of this invention will become apparent upon reading the annexed detailed description, particularly when considered in connection with the drawings, in which;

Fig. 1 is a diagram illustrating the geometric principle upon which a gnomonic projection is based;

Fig. 2 shows the method of using a Wycoff ruler for obtaining a gnomonic projection of an actual Laue diffraction pattern;

Fig. 3 is a view of the mechanical gnomonic projector according to the invention showing its use for obtaining a gnomonic projection of a Laue diffraction pattern; and Fig. 4 is an enlarged view of the apparatus of Fig. 3 showing its construction in considerable detail.

Referring now in more detail to the figures, a gnomonic projection is obtained as follows: The primary beam of X-rays 10, Fig. 1, passes through the crystal located at 11 in the center of a sphere (here represented by circle 12) and after being diffracted by diffracting plane of atoms 13 as beam 19, strikes the photographic plate 14 in Laue spot 15. The perpendicular 16 to plane 13 at 11 strikes the plane of projection 17 at 18. 18 is the gnomonic projection of plane 13 of the crystal or what is equivalent, the gnomonic projection of spot 15 of the Laue pattern. By repeating these steps for each Laue spot a complete gnomonic projection of all points on the Laue pattern is obtained. From the resultant two-dimensional graph such details as the size of the unit cell, distance between atoms and the like may be obtained.

The Wycoff ruler was one of the earliest instruments devised in order to facilitate the obtainment of a gnomonic projection of a Laue diffraction pattern. Such a ruler is shown in Fig. 2 where the distance of Laue spot 21 on the left side of the ruler is measured from the zero spot 22 of the photograph of the Laue diffraction pattern 23 and of the ruler 24, lying thereon. The projected spot, 25 has a numerical value corresponding to that of spot 21 and can hence be immediately measured off on the left side of the ruler and marked on the plane of projection 26. These steps can be repeated for each Laue spot and in this manner a gnomonic projection of the Laue diffraction pattern obtained. As explained above, a number of sources of error can crop in with the use of the Wycoff ruler. Because of this, the more accurate and more easily operated mechanical projector of this invention was devised.

The calculator shown in Figs. 3 and 4 is based upon the principle that the diagonal of a parallelogram having sides of the same length always bisects the opposite angles connected by the diagonal in all positions of distortion of the parallelogram. The principle is clearly shown in Fig. 1 by the broken line drawing of a parallelogram.

Thus, in Fig. 1, the diagonal 113 indicated in broken lines symbolizes the diffraction plane or planes 13 of crystal 11 which planes produce Laue spot 15. The side 145 as indicated in broken lines symbolizes one side of a parallelogram in particular the side forming the continuation of diffracted beam 19. The remaining sides of the parallelogram are 146, 147 and 148. Arms 147 and 145 are pivoted at 150 and 11, respectively, while the remaining arms are connected by moving pivots such as 151, 152. With this arrangement it is obvious from the vertical angles about point 11 that the diffracting plane lies at an angular displacement equal to ½ the diffracting angle 15, 11, 0 each making an angle $\theta$ and $2\theta$, respectively, with the zero beam. Hence by providing an arm which is pivoted at 11 (such as arm 41, Fig. 4) and which is simultaneously capable of movement in an arc with pivot pin 151, the perpendicular pole of any plane of crystals is immediately determined by an edge of arm 41 such as 60 extending perpendicularly to diagonal 113 (i. e. from 11 to 51, Fig. 4) at the point 11.

Since the angle swept out by the diagonal 113 is always ½ that of the angle swept out by the movement of side 145 it is obvious that by utilizing a position for the original setting of the diagonal which is in line with the zero beam and shifting pivot point 150 out of line with the zero beam as in Fig. 4, point 50, a position can be found which causes projecting arm 41 to operate in a more desirable range of distortion of the parallelogram formed by the arms 45, 46, and 47 (the arm corresponding to 148 of Fig. 1 being replaced by the base plate 40 since the pivot points 50 and 51 are both fixed in the base plate).

Then, in order to set the mechanism in condition for operation, the projector is placed on a Laue picture with the pinhole 0 over the zero beam spot, while the diagonal represented by a line from 51 to 11 is aligned with the incident beam. This places point 11 in the imaginary position of the crystal. Usually the distance 11 to 0 is 5 cm. If the Laue picture has been taken with the crystal at distances other than 5 cm., i. e., 4 cm., pivot pins 11 and 50 are moved in slots 75 and 76, respectively, a corresponding amount, thereby maintaining the parallelogram structure intact. The extension of arm 45, namely arm 70, is in the form of a bell crank, pivoted at 11 so that edge 71 comes directly over the zero beam spot 0 when the diagonal is aligned with the zero beam.

It has already been found from Fig. 1 that the angle between the incident beam and the diffracting plane makes an angle with the zero beam of ½ the angular distance between the diffracted beam and the incident beam, and it has also been found that diagonal line 51 to 11 (i. e. 113 of Fig. 1) sweeps out an angle ½ that of the angle simultaneously swept out by the movement of side 45. Then since arm 70 is a continuation of arm 45, arm 70 likewise sweeps out an angle of $2\theta$ while the diagonal sweeps out an angle of $\theta$. Hence edge 71 of arm 70 will, if placed on a Laue spot together with edge 42 of base plate 40, result in the positioning of diagonal 51—11 in line with the diffraction planes producing that particular Laue spot.

By providing arm 41 pivoted at 11 with a slot aligned with 11 such as slot 80 in which pivot pin 51 is free to slide, slot 80 is constantly maintained in the direction of the diffracting plane when arm 70 is in the direction of the diffracted beam. By making edge 60 perpendicular to the diagonal 51—11 at point 11, edge 60 serves as a perpendicular or pole to the diffracting plane. Hence the intersection of edge 60 of arm 41 and the lower edge 42 of base plate 40 is then a gnomonic projection 210, 211 of Laue spots 110, 111, respectively, Fig. 4.

In a similar manner, as shown in Fig. 3, the projector may be used to obtain gnomonic projections of various other Laue spots. To accomplish this the projector is placed on a Laue picture as shown in Fig. 3, with the pinhole 0 over the zero beam spot of the photograph 90 and the lower edge 42 of backing plate 40 and edge 71 of arm 70 intersecting at a Laue spot 1. By doing this for each of the Laue spots 1, 2, 3, 4, 5, 6, etc., the gnomonic projections 201, 202, 203, 204, 205, etc., respectively, are obtained.

The broken line drawing in Fig. 4 illustrates the relationship of the initial and final projecting parts of the mechanism in making a gnomonic projection 209 of Laue spot 9.

In order to enable arm 41 to be adjusted without changing the relationship of the various other mechanical parts thereby giving reduction or magnification of the final projection 210, 211, etc., slots such as 90, 91 of Fig. 4 and thumbscrews are provided in the left terminal portion 43 of arm 41 so as to make the lefthand portion 43 adjustable with respect to the righthand portion of arm 41.

It is to be understood that although this invention has been described in detail in its present preferred embodiment, it will be obvious to those skilled in the art, particularly after reading and understanding this description, that various changes and modifications may be made therein without departing from the spirit or scope of the invention. Thus, for example, the apparatus will function equally efficiently if arms 46 and 47 are made equal to, longer or shorter than arm 45, provided arms 46 and 47 are each of the same length. Likewise, other modifications are possible and are to be construed as within the purview of this disclosure. It is intended that the appended claims be construed as covering all such modifications and variations.

I claim:

1. In a gnomonic projector for reproducing the diffraction spots and the zero beam spot of an X-ray diffraction photograph of a crystal, a base member having a straight edge with a point thereon for positioning the member over the zero spot, a projection arm having a straight side, a pivot on the side for rotatably mounting the projection arm on the base member, an intersecting arm also mounted on the pivot for locating a spot along the straight edge, a plurality of interconnected parts constituting a pantograph on the intersecting arm, said parts actuating the projection arm in response to rotation of the intersecting arm to impart to the projection arm like angular movement of predetermined magnitude and sense.

2. In a gnomonic projector for reproducing the diffraction spots and the zero beam spot of an X-ray diffraction photograph of a crystal, a base member having a straight edge with a point thereon for positioning the member over the zero spot, a projection arm having a straight side, a pivot on the side for rotatably mounting the projection arm on the base member, a groove in the arm cut radially with respect to the pivot as a center and disposed perpendicularly to the straight side of the projection arm, a link having one end pivoted in the base member and the other fitted to slide in the groove, an intersecting arm also mounted on the pivot for locating a spot along the straight edge, a plurality of interconnected parts constituting a pantograph on the intersecting arm and the projection arm whereby, in response to rotation and positioning of the intersecting arm on a preselected spot the intersecting arm imparts like angular movement of one-half magnitude and sense to the projection arm which is positioned to effect a gnomonic projection of the spot at the intersection of the straight edge and the straight side.

3. In a projector according to claim 2, an adjustable extension for the projection arm whereby the magnification of the projection can be increased or decreased without changing the relationship of the parts constituting the pantograph.

4. In a projector according to claim 2, wherein a plurality of locations are provided in which the pivot on the side of the projection arm and the pivoted end of the link are adjustably positionable to heights above the straight edge corresponding to the original height of the crystal above the photograph.

5. In a projector according to claim 2, grooves in base cut perpendicularly to the straight edge wherein the pivot on the side of the projection arm and the pivoted end of the link are adjustably positionable to heights above the straight edge corresponding to the original height of the crystal above the photograph.

6. In a gnomonic projector for reproducing the diffraction spots and the zero beam spot of a Laue X-ray diffraction photograph of a crystal, a base member having a straight edge with a point thereon for positioning the member over the zero spot, a projection arm having a straight side, a pivot on the side for rotatably mounting the projection arm on the base member at a distance perpendicular to the edge and above the zero spot corresponding to the distance of the crystal from the pattern when the photograph was originally prepared, a groove in the arm cut radially with respect to the pivot as a center and disposed perpendicularly to the straight side of the projection arm, a link having one end pivoted in the base member and the other fitted to slide in the groove, a bell crank having two ends and rotatably mounted on the pivot supporting the projection arm one end being selectively operable to various positions along the base line in order to intersect the latter in reference points comprising Laue spots at different distances from the zero beam spot, and a second link joining the other end of the bell crank and the first mentioned link whereby a movement of the selectively operable end of the bell crank is accompanied by a movement of the projection arm to effect a gnomonic projection of a preselected Laue spot at the point of intersection of the straight edge and the straight side.

DAN McLACHLAN, Jr.